(12) United States Patent
Johnson

(10) Patent No.: US 6,385,700 B2
(45) Date of Patent: May 7, 2002

(54) SET-ASSOCIATIVE CACHE-MANAGEMENT METHOD WITH PARALLEL READ AND SERIAL READ PIPELINED WITH SERIAL WRITE

(75) Inventor: Mark W. Johnson, Elgin, IL (US)

(73) Assignee: Philips Electronics No. America Corp., New York, NY (US)

( * ) Notice: Subject to any disclaimer, the term of this patent is extended or adjusted under 35 U.S.C. 154(b) by 0 days.

(21) Appl. No.: 09/835,215

(22) Filed: Apr. 13, 2001

Related U.S. Application Data

(63) Continuation of application No. 09/336,904, filed on Jun. 21, 1999.

(51) Int. Cl.[7] .............................................. G06F 12/00
(52) U.S. Cl. ....................................... 711/140; 711/169
(58) Field of Search ................................ 711/128, 140, 711/168, 169

(56) References Cited

U.S. PATENT DOCUMENTS 4,899,275 A * 2/1990 Sachs et al. ................ 711/128
6,321,307 B1 * 11/2001 Maguire et al. ............ 711/146

* cited by examiner

Primary Examiner—Matthew Kim
Assistant Examiner—C. P. Chace
(74) Attorney, Agent, or Firm—Peter Zawilski

(57) ABSTRACT

A set-associative cache-management method combines one-cycle reads and two-cycle pipelined writes. The one-cycle reads involve accessing data from multiple sets in parallel before a tag match is determined. Once a tag match is determined, it is used to select the one of the accessed cache memory locations to be coupled to the processor for the read operation. The two-cycle write involves finding a match in a first cycle and performing the write in the second cycle. During the write, the first stage of the write pipeline is available to begin another write operation. Also, the first-stage of the pipeline can be used to begin a two-cycle read operation-which results in a power saving relative to the one-cycle read operation. Due to the pipeline, there is no time penalty involved in the two-cycle read performed after the pipelined write. Also, instead of a wait, a no-op can be executed in the first stage of the write pipeline while the second stage of the pipeline is fulfilling a write request.

8 Claims, 1 Drawing Sheet

SET-ASSOCIATIVE CACHE-MANAGEMENT METHOD WITH PARALLEL READ AND SERIAL READ PIPELINED WITH SERIAL WRITE

This application is a continuation of Ser. No. 09/336,904 filed Jun. 21, 1999.

BACKGROUND OF THE INVENTION

The present. invention relates to computers and, more particularly, to a method for managing a set-associative cache. A major objective of the present invention is to reduce average cache access times.

Much of modern progress is associated with the increasing prevalence. of computers. In a conventional computer architecture, a data processor manipulates data in accordance with program instructions. The data and instructions are read from, written to, and stored in the computer's "main" memory. Typically, main memory is in the form of random-access memory (RAM) modules.

A processor access main memory by asserting an address associated with a memory location. For example, a 32-bit address can select any one of up to $2^{32}$ address locations. In this example, each location holds eight bits, i.e., one "byte" of data, arranged in "words" of four bytes each, arranged in "lines" of four words each. In other words, there are $2^{30}$ word locations, and $2^{28}$ line locations.

Accessing main memory tends to be much faster than accessing disk and tape-based memories; nonetheless, main memory accesses can leave a processor idling while it waits for a request to be fulfilled. To minimize such latencies, cache memories intercept processor requests to main memory and attempt to fulfill them faster than main memory can.

To fulfill processor requests to main memory, caches must contain copies of data stored in main memory. In part to optimize access times, a cache is typically much less capacious than main memory. Accordingly, it can represent only a small fraction of main memory contents at any given time. To optimize the performance gain achievable by a cache, this small fraction must be carefully selected.

In the event of a cache "miss", when a request cannot be fulfilled by a cache, the cache fetches the entire line of main memory including the memory location requested by the processor. This entire line is stored in the cache since a processor is relatively likely to request data from locations that are near a location from which a recently made request was made. Where the line is stored depends on the type of cache.

A fully associative cache can store the fetched line in any cache storage location. The fully associative cache stores not only the data in the line, but also stores the line-address (the most-significant 28 bits) of the address as a "tag" in association with the line of data. The next time the processor asserts a main-memory address, the cache compares that address with all the tags stored in the cache. If a match is found, the requested data is provided to the processor from the cache.

There are two problems with a fully associative cache. The first is that the tags consume a relatively large percentage of cache capacity, which is limited to ensure high-speed accesses. The second problem is that every cache memory location must be checked to determine whether there is a tag that matches a requested address. Such an exhaustive match checking process can be time-consuming, making it hard to achieve the access speed gains desired of a cache.

In a direct-mapped cache, each cache storage location is given an index which, for example, might correspond to the least-significant line-address bits. For example, in the 32-bit address example, a six-bit index might correspond to address bits 23–28. A restriction is imposed that a line fetched from main memory can only be stored at the cache location with an index that matches bits 23–28 of the requested address. Since those six bits are known, only the first 22 bits are needed as a tag. Thus, less cache capacity is devoted to tags. Also, when the processor asserts an address, only one. cache location (the one with an index matching the corresponding bits of the address asserted by the processor) needs to be examined to determine whether or not the request can be fulfilled from the cache.

The problem with a direct-mapped cache is that when a line is stored in the cache, it must overwrite any data stored at that location. If the data overwritten is data that would be likely to be called in the near term, this overwriting diminishes the effectiveness of the cache. A direct-mapped cache does not provide the flexibility to choose which data is to be overwritten to make room for new data.

In a set-associative cache, the memory is divided into two or more direct-mapped sets. Each index is associated with one memory location in each set. Thus, in a four-way set associative cache, there are four cache locations with the same index, and thus, four choices of locations to overwrite when a line is stored in the cache. This allows more optimal replacement strategies than are available for direct-mapped caches. Still, the number of locations that must be checked, e.g., one per set, to determine whether a requested location is represented in the cache is quite limited, and the number of bits that need to be compared is reduced by the length of the index. Thus, set-associative caches provide an attractive compromise that combines some of the replacement strategy flexibility of a fully associative cache with much of the speed advantage of a direct-mapped cache.

When a set-associative cache receives an address from a processor, it determines the relevant cache locations by selecting the cache locations with an index that matches the corresponding address bits. The tags stored at the cache locations corresponding to that index are checked for a match. If there is a match, the. least-significant address bits are checked for the word location (or fraction thereof) within the line stored at the match location. The contents at that location are then accessed and transmitted to the processor.

In the case of a read operation, the cache access can be hastened by starting the data access before a match is determined. While checking the relevant tags for a match, the appropriate data locations within each set having the appropriate index are accessed. By the time a match is determined, data from all four sets are ready for transmission. The match is used, e.g., as the control input to a multiplexer, to select the data actually transmitted. If there is no match, none of the data is transmitted.

The read operation is much faster since the data is accessed at the same time as the match operation is conducted rather than after. For example, a parallel "tag-and-data" read operation might consume only one memory cycle, while a serial "tag-then-data" read operation might require two cycles. Alternatively, if the serial read operation consumed only one cycle, the parallel read operation would permit a shorter cycle, allowing for more processor operations per unit of time.

The gains of the parallel tag-and-data reads are not without some cost. The data accesses that do not provide the requested data consume additional power that can tax power sources and dissipate extra heat. The heat can fatigue, impair, and damage the incorporating integrated circuit and proximal components. Accordingly, larger batteries or power supplies and more substantial heat removal provisions may be required.

Nonetheless, such provisions are generally well worth the speed advantages of the parallel tag-and-data read accesses. A comparable approach to hastening write operations is desired. Unfortunately, the parallel tag-and-data approach is not applied to write operations since parallel data access would involve overwriting data that should be preserved. Accordingly, in the context of a system using parallel reads, the write operations have become a more salient limit to performance. What is needed is a cache management method in which write operation times more closely match those achieved using parallel tag-and-data reads.

SUMMARY OF THE INVENTION

The present invention provides a cache-management method using pipelined cache writes in conjunction with parallel tag-and-data reads. Thus, the cache can accept a second write request while writing the data from the previous write request. While each write operation takes place over two cycles, a series of write operations consumes much less than two cycles per write on average.

There are three possible types of processor events that can follow a pipelined write operation on the next cycle. The first type is a write operation, in which case the pipelining obtains the expected performance benefit. The second type is a "no-operation", neither a read nor a write. In this case, the pipelining allows the no-op to be executed during the second stage of a preceding write operation.

The third type is a read operation. In the case a parallel read follows a pipelined write, the read would not be begun until the write was completed. Thus, a wait might be inserted in the first stage of the write pipeline during the second cycle of the write. In this case, the speed advantage of pipelining is not realized.

Surprisingly, a pipelined write permits a power savings for an immediately following read operation. Instead of waiting until the second cycle of the write operation is completed to begin a parallel read, a serial read can be started in the second cycle of the write operation. The serial read can be completed in the first cycle after completion of the write operation, i.e., by the time a one-cycle parallel read operation would have been completed. Hence, the power savings associated with a serial read are achieved with none of the time penalty normally associated with serial reads. Thus, the invention provides both for faster average write access rates and for reduced power consumption. These and other features and advantages of the invention are apparent from the description below with reference to the following drawing.

BRIEF DESCRIPTION OF THE FIGURE.

In FIG. 1, method M1 is illustrated as a series of six processor (read and write) request cycles. Cycles that are completed in one cycle are indicated by a horizontal arrow; cycles that are completed in the cycle following the request are indicated by a downward sloping arrow.

DESCRIPTION OF THE PREFERRED EMBODIMENTS

Figure 1:
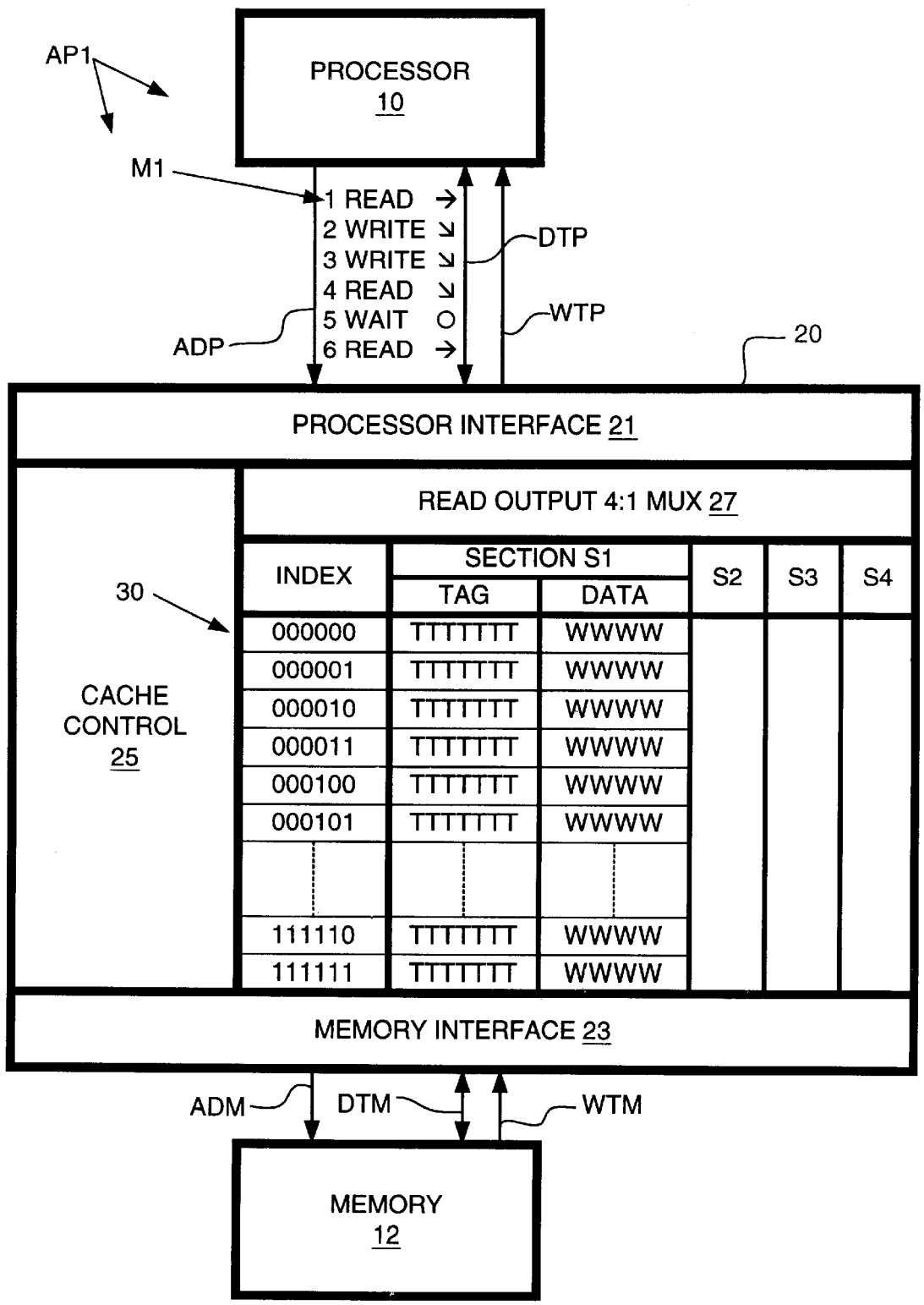
FIG. 1 is a composite schematic of the method of the invention and a computer system in which the method is implemented.

In accordance with the. present invention, a computer system AP1 comprises a data processor 10, a memory 12, and a cache 20, as shown in FIG. 1. Data processor 10 issues requests along a processor address bus ADP, which includes address lines, a read-write control line, and a memory request line. Data transfers between cache 20 and processor 10 take place along processor data bus DTP. In addition, cache 20 can issue wait requests to processor 10 along processor wait signal line WTP. Similarly, cache 20 can issue requests to memory 12 via memory address bus ADM. Data transfers between cache 20 and memory 12 are along memory data bus DTM. Memory 12 can issue wait requests to cache 20 via memory wait signal line WTM.

Cache 20 comprises a processor interface 21, a memory interface 23, a cache controller 25, a read output multiplexer 27, and cache memory 30. Cache memory 30 includes four sets S1, S2, S3, and S4. Set S1 includes 64 memory locations, each with an associated six-bit index. Each memory location stores a line of data and. an associated 22-bit tag. Each line of data holds four 32-bit words of data. Cache sets S2, S3, and S4 are similar and use the same six-bit indexes.

Method M1 of the invention is depicted as a series of processor request cycles in FIG. 1. While a specific series of cycles is described, it encompasses the situations most relevant to the invention. By "processor request cycle" is meant a version of a memory cycle phase-shifted to begin with a processor asserting a request (assuming that one is made).

In processor request cycle 1, processor 10 asserts a main-memory address and requests that data be read from the corresponding main-memory location. Processor interface 21 of cache 20 intercepts this request and forwards it to cache control 25, which selects an index based on bits 23–28 of the asserted address. Controller 25 compares the 22 most significant bits with the tags stored at the four cache memory locations (one in each set S1, S2, S3, and S4) sharing the determined index. Concurrently, controller 25 access the data at each of these locations so that they are respectively available at the four inputs of multiplexer 27. If a tag match is found in one of the sets, controller 25 selects the multiplexer input corresponding to that input so that the data at the indexed memory location of that set is output from multiplexer 27 to processor 10.

If there is no match, no input is selected. Cache controller 25 controls memory interface 23 so that the line containing the requested data from main memory 12 is fetched. The line is stored at the indexed location of one of the four sets. For example, the fetched line might replace the line at the index that was least recently used and thus least likely to be used again in the near future. Thus, the fetched data is stored at the location selected for overwrite, while the first 22 bits of the address used in the request are stored as the tag for that data.

If there is no match, data must be fetched from main memory. Thus, the read operation may consume several cycles. However, if there is a match, the parallel tag-and-data read is completed in one cycle. This is indicated by the horizontal arrow pointing to processor data bus DTP. Processor 10 is permitted to make another request in the next processor cycle.

In processor request cycle 2, processor 10 makes a write request. In cycle 2, cache 20 receives the address, checks the index bits, and compares tags at the four cache locations matching index bits. If there is no match, the data is written directly into memory. (In this case, a conventional "write-around" mode is employed; however, the invention is compatible with other modes of handling write-misses.) If there is a match, the word transmitted by the processor is written to the location determined by the index, the set with the matching tag, and the word positions indicated by bits 29 and 30 of the write address. This writing does not occur during processor request cycle 2, but during succeeding processor cycle 3, as indicated by the downward sloping arrow that points both toward processor data bus DTP and processor cycle 3.

Since writes are pipelined, processor 10 can make a second write request during cycle 3 while data corresponding to the first write request is being written. During this same cycle, the tag portion of the address asserted in the second write request is compared with the tags stored at the four cache-set memory locations having an index equal to the index bits of the requested address. As with the first write request, the actual writing is delayed one cycle as indicated by a downward sloping arrow.

The invention provides for further successive pipelined write operations. However, eventually, the write series ends either with a no-operation or a read operation. The no-op just allows the previous write operation to complete. The more interesting case in which a read request immediately follows a write request is explored with respect to processor request cycle 4.

Processor 10 makes a second read request at processor request cycle 4 while the write requested during cycle 3 is completed. Note that a parallel tag-and-data read is not possible within cycle 4 because of the ongoing write operation. To provide for such a parallel read operation, a wait would have to be inserted so that the parallel operations would be performed at cycle 5 instead of cycle 4.

In accordance with a refinement of the method of the invention, a read immediately following a pipelined write operation is performed serially. Specifically, the tag matching is performed in the same processor request cycle that the request is made. However, data is accessed and transmitted in the following cycle. Specifically, only data from a set having a tag match is provided to an input to multiplexer 27. (If there is no match, no data is accessed from cache memory 30). In this case, a match is detected during processor request cycle 4, and data is read at cycle 5, as indicated by the downward sloping arrow in the row corresponding to cycle 4.

In addition, during request cycle 4, cache 20 issues a wait request to processor 10 along processor wait signal line WTP. In response, processor 10 delays any pending request so that no request is made during processor cycle 5. Since no request is made during cycle 5, there is no arrow indicating when a cycle-5 request is fulfilled. Instead, a circle indicates that there is no fulfillment of a wait.

Processor 10 makes a third read request in cycle 6. Since there is nothing in the pipeline during cycle 6, a parallel tag-and-data read is completed in cycle 6, as indicated by the horizontal arrow in the row corresponding to cycle 6. Subsequent reads would also be one-cycle parallel reads. The case of a write following a parallel read is addressed in the discussion concerning cycles 1 and 2.

An alternative embodiment of the invention uses 2-cycle pipelined reads to save power whenever there is no time penalty involved in doing so. Thus, any read immediately following a pipelined read or write operation is pipelined. One-cycle parallel reads are used only after other parallel reads, no-ops, or cache misses. In this embodiment, no wait request is issued as in cycle 4 above. Thus, in cycle 5, a third read request can be made and then completed in cycle 6.

In method M1 of FIG. 1, modified in that the fourth cycle involves execution of a no-op, the no-op can be executed in the first-stage of the write pipeline while the write requested in the third cycle is completed. The less desirable alternative would be to issue a wait during the fourth cycle and execute the no-op during a fifth cycle. In general, the invention provides for withholding a "wait" that would conventionally be associated with the second cycle of a write operation until there is a resource available that can absorb it without accumulating an access latency.

As indicated above, the invention provides the greatest performance enhancement in cases where write operations occur frequently in series. In a conventional system with a single cache used for both instructions and data, such circumstances can be infrequent due to the number of instructions fetches, which are all reads. However, in a Harvard architecture, with separate data and instructions paths, the invention can be used to great advantage on the data cache. These and other variations upon and modifications to the described embodiments are provided for by the present invention, the scope of which is defined by the following claims.

What is claimed is:

1. A cache-management method for a system including a processor, main memory, and a set-associative cache having plural sets of cache locations containing copies of data stored in said main memory, said method comprising the steps of:

during a first request cycle in which said processor issues a first request to read first data from a first main-memory location, providing said first data to said processor from a first set of said plural sets;

during a second request cycle in which said processor issues a second request to write second data to a second main-memory location, determining a second set of said plural sets in which said second main-memory location is represented;

during a third request cycle in which said processor issues a third request to write third data to a third main-memory location, determining a third set of said plural sets in which said third main-memory location is represented, and writing said second data to said second set; and during a fourth request cycle in which said processor issues a fourth request to read fourth data from a fourth main-memory location, writing said third data to said third set and determining a fourth set of said plural sets in which said fourth main-memory location is represented; and during a fifth request cycle, providing said fourth data to said processor from said fourth set.

2. A method as recited in claim 1 wherein said second set is the same as said first set.

3. A method as recited in claim 1 wherein during said fourth fifth cycle, said cache issues a "wait" request to said processor.

4. A method as recited in claim 3 wherein said processor issues a no-op during said fifth request cycle.

5. A method as recited in claim 1 wherein, during said first processor cycle, said cache accesses data in all of said plural sets, said cache not transmitting accessed data to said processor other than from said first set.

6. A cache-management method comprising:

a parallel read;

a serial write; and a serial read pipelined with said serial write.

7. A method as recited in claim 6 wherein said serial write is a second serial write of a pair of serial writes, said pair also including a first serial write preceding and pipelined with said second serial write.

8. A computer system comprising:
   a processor;
   main memory; and
   a cache, including
   means for executing a parallel read;
   means for executing a serial write; and
   means for executing a serial read pipelined with said serial write.

* * * * *